United States Patent [19]

Suganuma et al.

[11] Patent Number: 5,199,532
[45] Date of Patent: Apr. 6, 1993

[54] ELECTROMAGNETIC ELEVATOR BRAKE

[75] Inventors: Manabu Suganuma, Yamato; Toshihiko Uematsu; Hisaki Kenmochi, both of Kofu, all of Japan

[73] Assignee: Otis Elevator Company, Farmington, Conn.

[21] Appl. No.: 769,103

[22] Filed: Sep. 30, 1991

[51] Int. Cl.⁵ ............................................. B66B 5/16
[52] U.S. Cl. ........................................ 187/80; 187/83; 187/86; 188/171; 335/177
[58] Field of Search ................ 187/80, 81, 82, 83, 187/84, 85, 86, 92, 93, 108; 188/171, 173; 335/177, 178, 179

[56] References Cited

U.S. PATENT DOCUMENTS

| 1,971,114 | 8/1934 | McCormick | 187/80 |
| 3,896,925 | 7/1975 | Mitsui et al. | 188/171 X |
| 5,014,828 | 5/1991 | Baldassarre | 187/86 X |

FOREIGN PATENT DOCUMENTS 1481532  5/1989  U.S.S.R. .

Primary Examiner—Robert P. Olszewski
Assistant Examiner—Dean A. Reichard
Attorney, Agent, or Firm—Lloyd D. Doigan

[57] ABSTRACT

An elevator brake is provided with a redundant means to release the brake to allow an elevator cab to move when a primary releasing means, such as a coil, does not release when desired. When the coil is deenergized or defective, an auxiliary coil is used to release the brake and enable the cab to move.

3 Claims, 2 Drawing Sheets

ELECTROMAGNETIC ELEVATOR BRAKE

FIELD OF THE INVENTION

This invention relates to elevators and more particularly to an electromagnetic brake therefor.

BACKGROUND ART

Elevators typically use electromagnetic brakes to stop the elevator car.

As shown in FIGS. 1 and 2, a typical electromagnetic brake for an elevator is shown. The brake has a pair of arms 2a and 2b which pivot about an axle 4. Brake pads 7 are attached at one end of arms 2a and 2b by means of bolts 5. As the brake arms pivot about the axle, the arms move the brake pads into contact with stationary rail 1 to stop the elevator car or out of contact with the rail to release the car for movement.

An axle 9a extends from an other end of arm 2a towards arm 2b. An axle 9b extends from an other end of arm 2b and is received axially within axle 9a. A ferromagnetic body 11a is attached to the axle 9a. Similarly, a ferromagnetic body 11b is attached to the axle 9b. A spring 23 is disposed about the axles 9a and 9b and acts to bias the ferromagnetic bodies 11a and 11b apart. A coil 13 is disposed within a circumferential groove 19 within the ferromagnetic body 11b. The coil is connected to a conventional power source (not shown) via an electrical line 15.

The electromagnet is attached to the elevator cab, as is known in the art.

With this type of electromagnetic brake, when the coil is not energized, the spring urges the brake arms to pivot about the axle 4 thereby forcing the brake pads 7 into contact with the rail. The elevator cab is then effectively stopped from movement. When the coil 13 is excited, the ferromagnetic bodies are attracted to each other, in opposition to the force of the spring, thereby releasing the brake pads from the rail.

If the coil 13 is defective or the power source is disconnected, the ferromagnetic bodies will not overcome the spring force to urge the brake pads out of contact with the rail. Since the spring force keeps the brake pads in contact with the rail, the cab may not be easily moved and elevator passengers may be in the cab for an unacceptable time period.

As a result, a new type of electromagnetic brake is required.

DISCLOSURE OF THE INVENTION

It is an object of the invention to readily remove passengers from an elevator cab in which a brake or braking system is in need of repair.

It is a further object of the invention to more readily repair a defective electromagnetic brake or braking system.

According to the invention, an elevator brake is provided with a redundant means to release the brake to allow an elevator cab to move when a primary releasing means does not release when desired.

Normally, an elevator electromagnetic brake utilizes a main coil for releasing a brake from elevator rails. In the present invention, when the main coil is not functioning as desired, an auxiliary coil is used to release the brake from the rails to enable the cab to move to a location suitable for making repairs. When the repairs are effectuated, control of the brake release is switched back to the main coil. Since it is possible to disengage the brake even if the main coil is disconnected, it is possible to make repairs after the elevator cab has been moved to the desired location and the people inside have left the cab.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
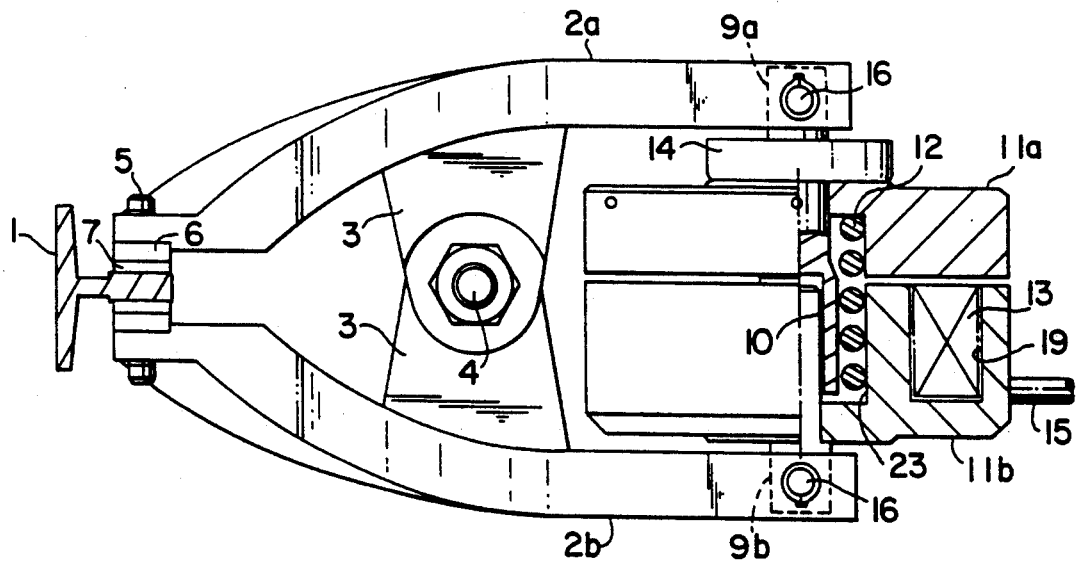
FIG. 1 is a perspective view of an electromagnetic brake, partially cut away, utilized in the prior art.
Figure 2:
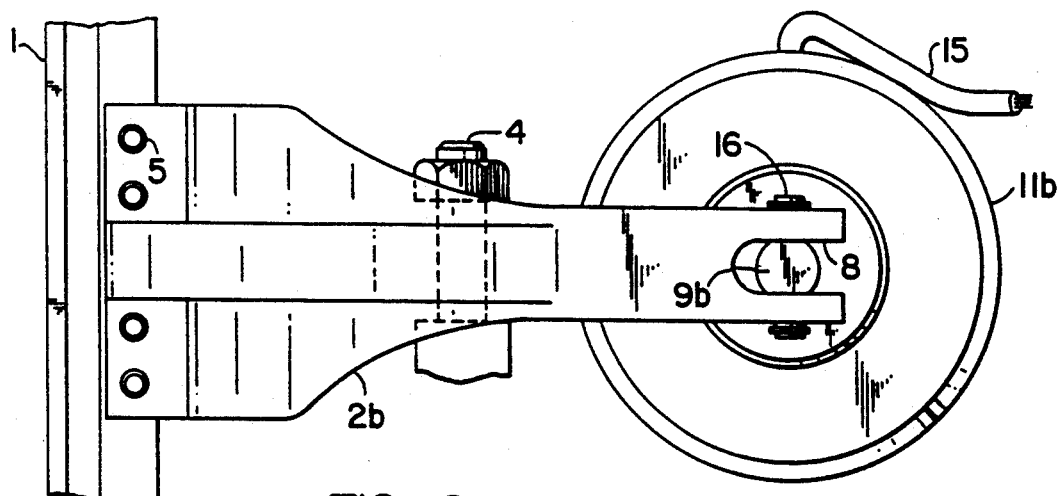
FIG. 2 is a bottom view of the prior art brake of FIG. 1.
Figure 3:
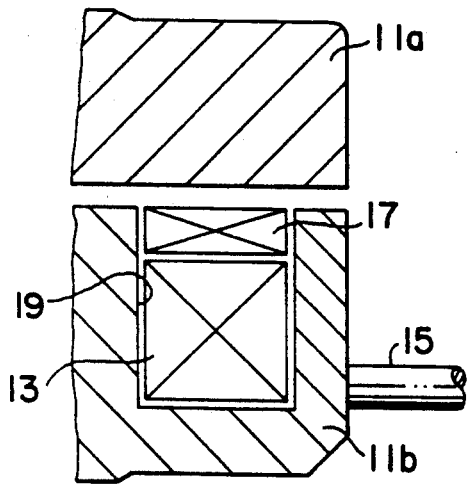
FIG. 3 shows a first embodiment of an electromagnetic brake employing the concepts of the invention.
Figure 4:
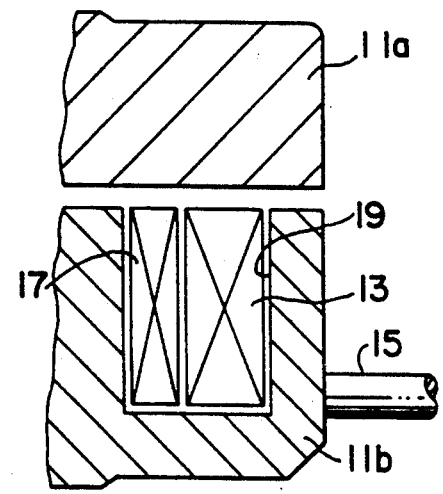
FIG. 4 shows a second embodiment of an electromagnetic brake employing the concepts of the invention.
Figure 5:
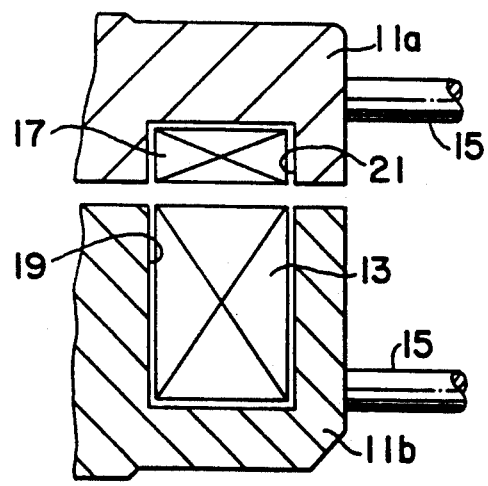
FIG. 5 shows a third embodiment of an electromagnetic brake employing the concepts of the invention.

Referring to FIGS. 3-5, three embodiments of an auxiliary brake for use with the prior art electromagnet of FIGS. 1 and 2 are shown.

FIG. 3 shows a ferromagnetic body 11b having a main coil 13 installed in a circumferential groove 19 therein. A ring-shaped auxiliary coil 17 is installed within the circumferential groove atop the main coil 13.

FIG. 4 shows the auxiliary coil 17 installed within a radially inward portion of the circumferential groove relative to the main coil 13.

FIG. 5 shows the auxiliary coil 17 installed in a circumferential groove 21 in the magnet body 11a.

Referring to FIGS. 1 and 3-5, when the main coil 13 is disconnected from a power source (not shown), or is defective, the force of spring 23 pivots arms 2a, 2b to apply the brake pads 7 to the rail 1, as is known in the prior art. The braking force on the rail causes the elevator cab to stop. A switch (not shown) is utilized to supply power to the auxiliary coil 17. The auxiliary coil creates a field which attracts the ferromagnetic bodies into contact (compressing the spring 23) thereby urging the arms to rotate about the axle 4 and release the brake pads from the rail. The cab is then free to move to a position where the passengers may disembark and where the elevator may be expeditiously serviced.

Since the coils installed in the magnet bodies are separated into a main and auxiliary coil, if the main coil is disconnected or defective, the brake can be disengaged by having a controller, such as a computer (not shown) send current to the auxiliary coil. Thus, the elevator cab can be moved to a desired location minimizing the probability that people will be trapped within the cab.

While the present invention has been illustrated and described with respect to a particularly preferred embodiment thereof, it will be appreciated by those skilled in the art that various other changes, omissions, and additions in the form and detail thereof may be made therein without departing from the spirit and scope of the invention. One of ordinary skill in the art will recognize that this brake may also be utilized upon an elevator counterweight.

We claim:

1. An elevator electromagnetic brake for engaging a fixed surface, said brake comprising:
   a pair of brake arms, said brake arms pivoting about an axis,
   a braking surface attaching to one end portion of each arm,
   a body portion attaching to a second end portion of each arm,
   a means for urging said arms to pivot about said axis to urge said braking surfaces into engagement with said fixed surface,
   a primary electromagnet disposed within one of said body portions for urging said arms to pivot about said axis to urge said braking surfaces out of engagement with said fixed surface against a force of said means, and
   a secondary electromagnet disposed within one of said body portions for urging said arms to pivot about said axis to urge said braking surfaces out of engagement with said fixed surface against a force of said means if said primary electromagnet does not urge said arms to pivot about said axis to urge said braking surfaces out of engagement with said fixed surface as desired, said secondary electromagnet being arranged in a same one of said body portions as said primary electromagnet, said secondary electromagnet being disposed concentrically within a diameter of said primary electromagnet.

2. An elevator electromagnetic brake for engaging a fixed surface, said brake comprising:
   a pair of brake arms, said brake arms pivoting about an axis,
   a braking surface attaching to one end portion of each arm,
   a body portion attaching to a second end portion of each arm,
   a means for urging said arms to pivot about said axis to urge said braking surfaces into engagement with said fixed surface,
   a primary electromagnet disposed within one of said body portions for urging said arms to pivot about said axis to urge said braking surfaces out of engagement with said fixed surface against a force of said means, and
   a secondary electromagnet disposed within one of said body portions for urging said arms to pivot about said axis to urge said braking surfaces out of engagement with said fixed surface against a force of said means if said primary electromagnet does not urge said arms to pivot about said axis to urge said braking surfaces out of engagement with said fixed surface as desired, said secondary electromagnet being arranged in a same one of said body portions as said primary electromagnet, said secondary electromagnet being disposed between said primary electromagnet and said other of said body portions.

3. An elevator electromagnetic brake for engaging a fixed surface, said brake comprising:
   a pair of brake arms, said brake arms pivoting about an axis,
   a braking surface attaching to one end portion of each arm,
   a body portion attaching to a second end portion of each arm,
   a means for urging said arms to pivot about said axis to urge said braking surfaces into engagement with said fixed surface,
   a primary electromagnet disposed within one of said body portions for urging said arms to pivot about said axis to urge said braking surfaces out of engagement with said fixed surface against a force of said means, and
   a secondary electromagnet disposed within one of said body portions for urging said arms to pivot about said axis to urge said braking surfaces out of engagement with said fixed surface against a force of said means if said primary electromagnet does not urge said arms to pivot about said axis to urge said braking surfaces out of engagement with said fixed surface as desired, said secondary electromagnet being arranged in a same one of said body portions and said primary electromagnet being disposed within said other of said body portions.

* * * * *